United States Patent [19]

Pardner

[11] Patent Number: 5,360,342
[45] Date of Patent: Nov. 1, 1994

[54] COLORING BOARD WITH ATTACHED CRAYONS

[76] Inventor: Delores R. Pardner, Box 472122, Aurora, Colo. 80047

[21] Appl. No.: 49,320

[22] Filed: Apr. 21, 1993

[51] Int. Cl.⁵ .................... G09B 11/10; B43L 1/00; B43L 23/00
[52] U.S. Cl. .................... 434/84; 434/415; 401/88
[58] Field of Search .................... 434/84, 85, 391, 415; 401/88, 131

[56] References Cited

U.S. PATENT DOCUMENTS

| | | | |
|---|---|---|---|
| 262,757 | 8/1882 | Fowler | 434/415 |
| 759,892 | 5/1904 | Johnson | 434/415 |
| 2,285,000 | 6/1942 | Wallace | 401/131 X |
| 4,155,446 | 5/1979 | Aronson | 401/88 X |
| 4,611,994 | 9/1986 | Glover | 434/85 |
| 4,699,536 | 10/1987 | Berman | 401/88 |
| 4,740,161 | 4/1988 | Schwartz et al. | 434/162 |
| 4,826,338 | 5/1989 | Kilpatrick | 401/35 |

OTHER PUBLICATIONS

Aids & Appliances, 18th ed. Jul. 1972–Jun. 1973 "Raised Line Drawing Kit" 434/85.

*Primary Examiner*—Gene Mancene
*Assistant Examiner*—Cindy A. Cherichetti
*Attorney, Agent, or Firm*—Donn McGiehan

[57] ABSTRACT

A coloring or drawing board for use by children comprising a central planar surface upon which may be placed and held a coloring book or a paper pad and having a plurality of receptacles along the upper edge for receiving a plurality of crayons. Each of the crayons is tethered to the board permitting use for drawing and coloring on the board, but precluding improper use elsewhere such as on walls of a building.

4 Claims, 1 Drawing Sheet

COLORING BOARD WITH ATTACHED CRAYONS

BACKGROUND OF THE INVENTION

1. Field of the Invention

My invention relates generally to a child's educational device and more particularly to a portable drawing and coloring board capable of receiving and holding a pad of paper or a coloring book and a plurality of crayons or other styli.

Such coloring boards, much like this arrangement, provide an educational and entertaining device for children, of all ages say, one to ten, teach skills such as manual dexterity, writing, drawing, reading, composition and coloring.

2. Description of the Prior Art

Children's training aids for teaching manual dexterity, writing, drawing, and coloring are well known in the prior art but none are known which provide a combination of a portable coloring and drawing board with a set of crayons. The board of the instant invention is capable of receiving and holding a pad of paper centrally located and a plurality of crayons along the upper edge of the board.

Heretofore children were provided with a desk, upon which was placed a coloring book or pad of paper and a box of crayons such as 'Crayolas' ©. This situation obviously allows a child to get up and roam around the room with the crayons to do such devious acts as coloring on walls, floors, furniture and other surfaces causing sometimes irreparable harm. Also, it is not uncommon for some children to chew and swallow crayons causing distressing results.

There is also available on the market portable drawing boards for drafting by engineers and architects, clip boards for data taking, and easels for artists. Furthermore, there is available free standing devices for placing on a desk and holding a plurality of crayons or other writing instruments. It can now be appreciated that the separate crayon holders will not preclude the child's use of the crayons on prohibited surfaces.

The prior art does not address the problem of providing a child's coloring board with crayons attached thereto, thus providing an entertaining yet safe training device. For example, U.S. Pat. No. 4,826,338 to Kilpatrick discloses a pen holder for a layout artist having a plurality of apertures for holding the pens in convenient reach for use on the drafting table. This device might be adapted to make a coloring board and crayon holder, but, of course, the crayons could be used elsewhere.

Another prior art device for holding color markers is exemplified in U.S. Pat. No. 4,155,446 to Aronson disclosing a holder for placing on a desk and having color-coded apertures for displaying and receiving same color markers. Again there is no connection between the markers and holder to a coloring board.

The prior art also reveals writing instruments tethered to a desk or holder as commonly found in banks and as exemplified by U.S. Pat. No. 4,699,536 to Berman. The pen is held in a receptacle and at tether is attached to the pen to permit use on the desk but preclude its use elsewhere.

SUMMARY OF THE INVENTION

Briefly, the instant invention overcomes the disadvantages of the prior art children's coloring book and crayon sets by providing a child's coloring board for receiving a coloring book or the like on the central planar surface thereof and having a row of receptacles along the top edge of the board for receiving a plurality of crayons, which crayons are also tethered to the board.

This coloring board and crayon holder has a planar surface with a size of approximately 12 in. from top to bottom and 18 in. from side to side. Along the top edge of the planar surface is located a plurality of receptacles formed in the surface perhaps ½-¾ inch in depth and ⅜ inch in diameter to receive the well-known crayons such as those made and sold as 'Crayolas' ©. Alongside each receptacle is a small diameter aperture for receiving and retaining a flexible cord at one end thereof, the other end which is connected, in any known manner, to each one of the crayons. The tethers are long enough to reach only areas on the board.

In order to teach reading and color identification, around each receptacle the color of the crayon is spelled out and the color insert is printed on the board.

The central portion of the coloring board is intended to hold a coloring book, a pad of paper or the like, upon which a child may color and draw using the tethered crayons. The coloring book is held in place by a spring clip such as used on a clip board or by a hook-and-loop fastener known as 'Velcro ©'. Around the periphery of the coloring board there may be printed other indicia to act as a training aid for children of the age of one to ten.

It is to be noted that the main feature and major purpose of my coloring board is to provide a child with a coloring board for drawing and coloring purposes but to preclude mischievous scribbling and coloring on any other surface such as walls, floors, furniture, etc. often causing irreparable damage. Therefore, I provide a device which is essentially child-proof and also puts the parent's minds at ease because they will not have to scrutinize the child at all times.

STATEMENT OF THE OBJECTS OF THE INVENTION

Accordingly, an object of the invention is to provide at new and improved educational device for a child.

Another object of the instant invention is to provide children with a drawing and coloring board for holding a coloring book and crayons.

Still another object of my invention is to provide a child with a coloring board and crayon set which permits drawing and coloring on the board, yet precludes mischievous drawing and coloring on forbidden surfaces such as walls, floors, furniture and the like.

A still further object of the instant invention is to provide a family with an educational drawing and coloring device for the child as well as alleviating the fears of the parents that the child will do mischievous damage to the home.

BRIEF DESCRIPTION OF THE DRAWINGS

These and other objects, advantages, and novel features of the invention will become apparent from the following detailed description of the invention when considered in conjunction with the accompanying drawings wherein.

DESCRIPTION OF THE PREFERRED EMBODIMENT

Figure 1:
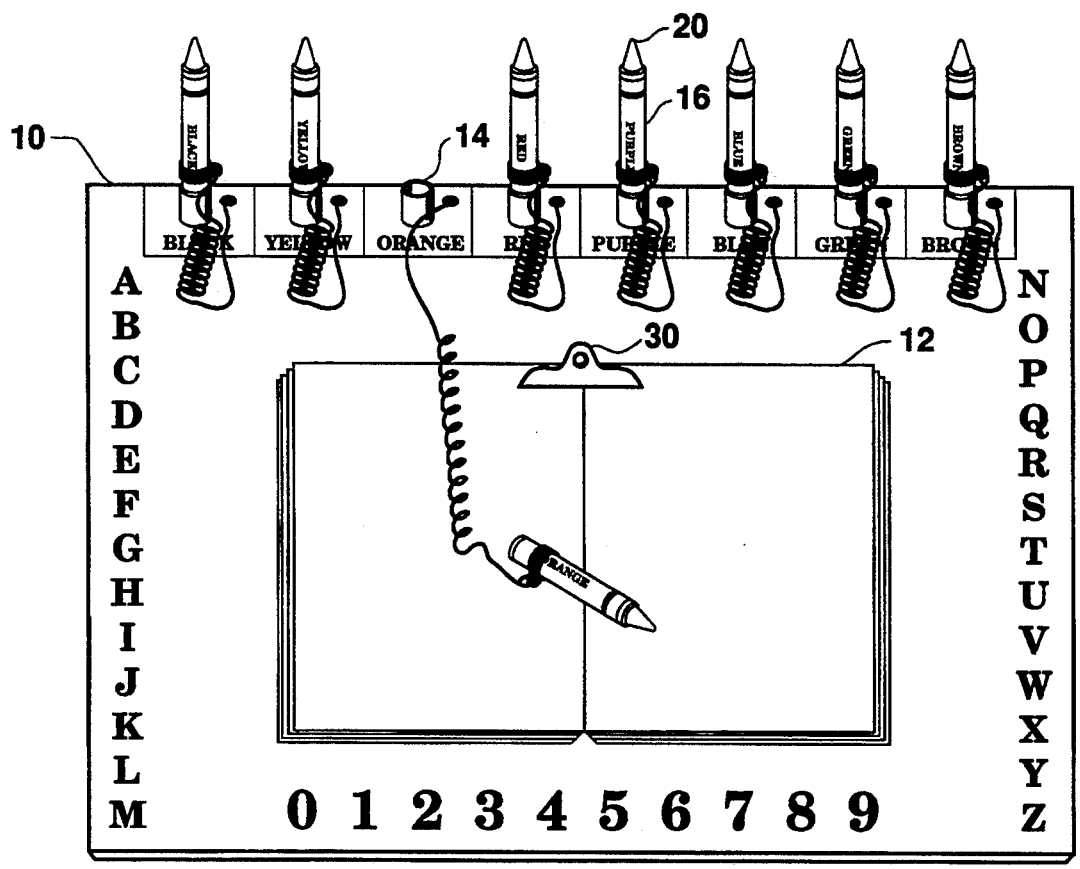
FIG. 1 is an isometric, pictorial view of the coloring board according to the invention.

Referring now to the drawing, there is shown generally in FIG. 1, a coloring board 10 with a coloring book 12 placed centrally and also having a plurality of apertures 14 with crayons 16 inserted therein. Connected to each crayon 16 at the butt-end 18, opposite the crayons usually pointed end 20 is a tether 22 which is also attached to the board 10, and having a length just long enough so that the crayon may be used only for coloring on the coloring book 12 held on the board.

The board 10 may be fabricated from wood, plastic, or the like, and be approximately 12 in. from top to bottom and 18 in. from side to side.

Figure 2:
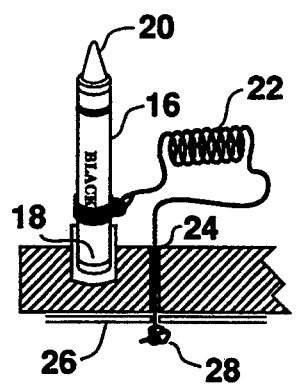
FIG. 2 is a cross-sectional view of the board, showing the aperture, crayon and tether arrangement.

Referring now to FIG. 2, the crayon 16 is shown inserted butt end first into a receptacle in board 10. The tether may be connected to the crayon by a noose, easily removable from the crayon 16. The tether may be held to the board by providing aperture 24, a washer 26 at the bottom, and a knot 28 in the tether below the washer. The tether 22 may be made of elastic cord, beadchain, monofilament nylon, coiled or straight.

Obviously many modifications and variations of the present invention are possible in light of the above teachings. It is therefore to be understood that within the scope of the appended claims, the invention may be practiced otherwise than as specifically described above.

What is claimed is:

1. A coloring or drafting board for use by children on a desk comprising:
   a central planar surface on the board upon which a coloring book or a pad of paper may be placed;
   a plurality of upstanding tubular receptacles along the upper edge of the board for receiving a plurality of various different colored crayons: and
   a plurality of coiled plastic nylon tethers connected between said crayons and said board; thereby permitting their use for drawing and coloring on said board, but precluding improper use elsewhere.

2. The coloring or drafting board of claim 1 further comprising:
   indicia associated with each upstanding receptacle designating a color and the color word.

3. The coloring or drafting board of claim 2 further comprising:
   indicia on the outer edges of the board for training aids such as the alphabet and numbers.

4. The coloring or drafting board of claim 2, further comprising:
   a spring clip on the planar surface for holding said coloring book or pad of paper.

* * * * *